US012594214B2

(12) United States Patent
Yang

(10) Patent No.: US 12,594,214 B2
(45) Date of Patent: Apr. 7, 2026

(54) DOUBLE-ECCENTRIC-WHEEL-DRIVEN MASSAGER WITH REPLACEABLE COPLANAR MASSAGE HEADS

(71) Applicant: Shenzhen Future Atom Tree Technology Co., Ltd., Shenzhen (CN)

(72) Inventor: Tiansheng Yang, Shenzhen (CN)

(73) Assignee: Shenzhen Future Atom Tree Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/308,776

(22) Filed: Aug. 25, 2025

(65) Prior Publication Data

US 2025/0387289 A1 Dec. 25, 2025

(51) Int. Cl.
*A61H 15/00* (2006.01)

(52) U.S. Cl.
CPC ... *A61H 15/0085* (2013.01); *A61H 2015/005* (2013.01); *A61H 2201/0188* (2013.01);
(Continued)

(58) Field of Classification Search
CPC ............ A61H 15/0085; A61H 15/0078; A61H 15/0092; A61H 15/00; A61H 23/00;
(Continued)

(56) References Cited

U.S. PATENT DOCUMENTS 3,672,355 A * 6/1972 Ogawa .............. A61H 23/0263
601/135
11,376,187 B2 † 7/2022 Zhao
(Continued)

FOREIGN PATENT DOCUMENTS

CN 219375425 U * 7/2023
CN 223169987 † 8/2025
(Continued)

OTHER PUBLICATIONS

Machine translation of written description and claims for KR-1346250-B1 via google patents (Year: 2013).*
(Continued)

*Primary Examiner* — Bradley H Philips
*Assistant Examiner* — Tyler A Raubenstraw
(74) *Attorney, Agent, or Firm* — Hemisphere Law, PLLC

(57) ABSTRACT

A double-eccentric-wheel-driven massager with replaceable coplanar massage heads includes: a housing including an upper cover and a lower cover; a drive mechanism disposed in the housing and provided with a drive shaft; centrosymmetrical connecting rods, where the centrosymmetrical connecting rods each include an input portion at a middle and symmetrical vertical rods extending downward, the input portion is in driving connection with the drive mechanism, and the symmetrical vertical rod is driven by the drive mechanism to make a reciprocating motion; a massage member, including a first connecting rod and first massage heads, the first connecting rod being detachably connected to the symmetrical vertical rod; a limiting portion disposed on the lower cover; and a limiting member connected to the symmetrical vertical rod and cooperating with the limiting portion to limit a downward motion of the symmetrical vertical rod, thereby driving a reciprocating motion of the massage member.

13 Claims, 9 Drawing Sheets

(52) U.S. Cl.
CPC .. *A61H 2201/1207* (2013.01); *A61H 2201/14* (2013.01); *A61H 2201/1454* (2013.01); *A61H 2201/1669* (2013.01); *A61H 2201/1685* (2013.01)

(58) Field of Classification Search
CPC .. A61H 23/006; A61H 23/02; A61H 23/0254; A61H 23/0263; A61H 2023/0272; A61H 2023/0281; A61H 2015/005; A61H 2201/0188; A61H 2201/1207; A61H 2201/14; A61H 2201/1454; A61H 2201/1669; A61H 2201/1685
See application file for complete search history.

(56) References Cited

U.S. PATENT DOCUMENTS

| | | | | | |
|---|---|---|---|---|---|
| 11,723,830 | B1 * | 8/2023 | Marton | A61H 23/006 601/108 |
| 12,427,083 | B1 * | 9/2025 | Chen | A61H 1/00 |
| 2005/0256434 | A1 * | 11/2005 | Luo | A61H 15/00 601/103 |
| 2011/0184324 | A1 * | 7/2011 | Wu | A61H 7/007 601/112 |
| 2012/0253248 | A1 * | 10/2012 | Carlson | A61H 15/00 601/128 |
| 2014/0046127 | A1 * | 2/2014 | Topolovac | A61H 23/04 600/38 |
| 2014/0121577 | A1 * | 5/2014 | Ma | A61H 15/0078 601/112 |
| 2014/0163441 | A1 * | 6/2014 | Chen | A61H 7/007 601/111 |
| 2014/0276277 | A1 * | 9/2014 | Chen | A61H 7/004 601/112 |
| 2015/0305966 | A1 * | 10/2015 | George | A61H 39/04 601/131 |
| 2015/0360014 | A1 * | 12/2015 | Decaux | A45D 34/04 604/20 |
| 2016/0175185 | A1 * | 6/2016 | Buchner Santos | A61H 23/006 601/113 |
| 2018/0193219 | A1 * | 7/2018 | Hashimoto | A61H 7/005 |
| 2018/0271742 | A1 * | 9/2018 | Caberlotto | A61H 23/0254 |
| 2019/0192376 | A1 * | 6/2019 | Xie | A61H 15/00 |
| 2019/0247271 | A1 * | 8/2019 | Lee | A61H 23/006 |
| 2019/0350793 | A1 * | 11/2019 | Wersland | A61H 23/006 |
| 2022/0031554 | A1 † | 2/2022 | Hu | |
| 2022/0062094 | A1 * | 3/2022 | Chen | A61H 23/006 |
| 2022/0331199 | A1 † | 10/2022 | Zang | |
| 2022/0387252 | A1 * | 12/2022 | Zhou | A61H 23/0254 |
| 2023/0149257 | A1 * | 5/2023 | Lee | B60N 2/995 601/98 |
| 2024/0099926 | A1 | 3/2024 | Carlucci et al. | |
| 2024/0099932 | A1 | 3/2024 | Carlucci et al. | |
| 2024/0382372 | A1 | 11/2024 | Zhou | |
| 2025/0000742 | A1 * | 1/2025 | He | A61H 23/006 |
| 2025/0281353 | A1 * | 9/2025 | Wu | A61H 23/0263 |

FOREIGN PATENT DOCUMENTS

| | | | | | |
|---|---|---|---|---|---|
| KR | 1346250 | B1 | * | 10/2013 | |
| KR | 101346250 | | † | 12/2013 | |
| WO | WO-2009146351 | A1 | * | 12/2009 | A61H 7/007 |

OTHER PUBLICATIONS

Machine translation of written description and claims for CN-219375425-U via google patents (Year: 2023).*

* cited by examiner
† cited by third party

DOUBLE-ECCENTRIC-WHEEL-DRIVEN MASSAGER WITH REPLACEABLE COPLANAR MASSAGE HEADS

TECHNICAL FIELD

The present disclosure relates to the technical field of massage devices, and in particular to a double-eccentric-wheel-driven massager with replaceable coplanar massage heads.

BACKGROUND

As healthcare equipment designed based on principles of the physics, bionics, and traditional Chinese medicine (TCM), massagers are conducive to relieve muscle fatigue and promote blood circulation. For existing massagers, the structure is complex, the massage heads cannot be coplanar and are replaced cumbersomely, and the massage is not comfortable enough.

Therefore, a double-eccentric-wheel-driven massager with replaceable coplanar massage heads is provided.

SUMMARY

An objective of the present disclosure is to provide a double-eccentric-wheel-driven massager with replaceable coplanar massage heads, to solve the above problems.

To achieve the above-mentioned objective, the present disclosure provides the following technical solutions: A double-eccentric-wheel-driven massager with replaceable coplanar massage heads includes:

a housing, the housing including an upper cover and a lower cover;

a drive mechanism, where the drive mechanism is disposed in the housing, and the drive mechanism is provided with a drive shaft;

centrosymmetrical connecting rods, where there are two centrosymmetrical connecting rods; two ends of the drive shaft are respectively connected to the centrosymmetrical connecting rods; the centrosymmetrical connecting rod includes an input portion at a middle and symmetrical vertical rods extending downward; the input portion is in driving connection with the drive mechanism; and the symmetrical vertical rod is driven by the drive mechanism to make a reciprocating motion toward or away from the drive shaft;

a massage member, where the massage member is disposed under the lower cover; the massage member includes a first connecting rod and first massage heads connected to the first connecting rod; and the first connecting rod is detachably connected to the symmetrical vertical rod;

a limiting portion, the limiting portion being disposed on the lower cover; and a limiting member, where the limiting member is connected to the symmetrical vertical rod; and the limiting member cooperates with the limiting portion, so as to limit a downward motion of the symmetrical vertical rods toward or away from the drive shaft, thereby driving a reciprocating motion of the massage member toward or away from the drive shaft.

Further, the drive mechanism includes eccentric wheels and rolling bearings; the eccentric wheels are respectively sleeved on the two ends of the drive shaft; the rolling bearings are respectively sleeved on the eccentric wheels; the input portion is an annular sleeving hole; the annular sleeving hole is sleeved on the rolling bearing; and when driven by the drive mechanism, the eccentric wheels on the drive shaft rotate at a same speed and in a same direction, and the annular sleeving hole makes a circular motion, thereby driving the symmetrical vertical rod to make a synchronous reciprocating motion.

Further, the limiting member is a silicone compression ring; the limiting portion is a channel hole formed in the lower cover; the silicone compression ring is internally hollow; the silicone compression ring is sleeved on the symmetrical vertical rod; the silicone compression ring includes an upper boss and a lower boss; an outer diameter of the upper boss is greater than a diameter of the channel hole; and an outer diameter of the lower boss is less than the diameter of the channel hole.

Further, the double-eccentric-wheel-driven massager with replaceable coplanar massage heads further includes cushioning silicone; the cushioning silicone is sleeved on the silicone compression ring; the cushioning silicone is sleeved on the lower boss; an internal lower side of the cushioning silicone is provided with a mounting hole portion sleeved on the symmetrical vertical rod; an outer diameter of the cushioning silicone is less than the diameter of the channel hole; first mounting holes are respectively extended outward from two sides of the upper boss of the silicone compression ring; the cushioning silicone is provided with second mounting holes corresponding to the first mounting holes in terms of quantity and position; the first mounting hole is located on the second mounting hole; and the first mounting hole and the second mounting hole are connected.

Further, the double-eccentric-wheel-driven massager with replaceable coplanar massage heads further includes a mainboard, a key panel, and a battery; the mainboard is connected to the key panel and the battery; the mainboard and the battery are disposed in the housing; the key panel is disposed on the housing; the drive mechanism is a motor; the mainboard is configured to control rotation of the motor; and the battery is connected to the motor.

Further, the double-eccentric-wheel-driven massager with replaceable coplanar massage heads further includes a lighting assembly; the lighting assembly is disposed on the lower cover; the lighting assembly includes a lamp panel, a light guiding member, and a decorating member; the mainboard is electrically connected to the lamp panel; the light guiding member is connected under the lamp panel; the decorating member is connected under the light guiding member; and the light guiding member is clamped with the lower cover.

Further, two ends of the housing each are provided with a handle.

Further, a charging port is formed in the mainboard; and an exposure hole for exposing the charging port is formed in the housing.

Further, mounting portions in opposite directions are respectively disposed at the two ends of the drive shaft; the mounting portion is a notched member; and the eccentric wheel is sleeved on the notched member.

Further, a bottom of the symmetrical vertical rod is provided with a mounting rod; the first connecting rod is provided with a mounting interface hole matching with the mounting rod in shape for mounting; a silicone sleeve is disposed at the mounting interface hole; and the first connecting rod is closely connected to the mounting interface hole through the silicone sleeve.

Further, a bottom of the symmetrical vertical rod is provided with a mounting rod; the mounting rod is provided with a first buckle; and the first connecting rod is provided with a second buckle cooperating with the first buckle.

Further, a bottom of the symmetrical vertical rod is provided with a mounting rod; the mounting rod is provided with a first magnet; the first connecting rod is provided with a second magnet cooperating with the first magnet; and the first magnet and the second magnet attract each other.

Further, an annular groove is formed between the cushioning silicone and the mounting hole portion.

Further, the first connecting rod is Y-shaped; and two ends of a bottom of the first connecting rod are respectively connected to the first massage heads.

Further, the first massage heads are spherical or conical or flathead-shaped.

Compared with the prior art, the present disclosure has the following beneficial effects:

The massage member in the present disclosure may be in the close-fit connection with the symmetrical vertical rod through the buckle and the magnet, thereby realizing second-level replacement, and adapting to different massage scenarios. The present disclosure has the following advantages: dynamic level maintenance: a leveling base is configured to maintain the first massage heads coplanar in vibration; accurate amplitude control: a travel error is controlled in a small range through double-step limitation; and comfortable massage.

DETAILED DESCRIPTION OF THE EMBODIMENTS

Figure 1:
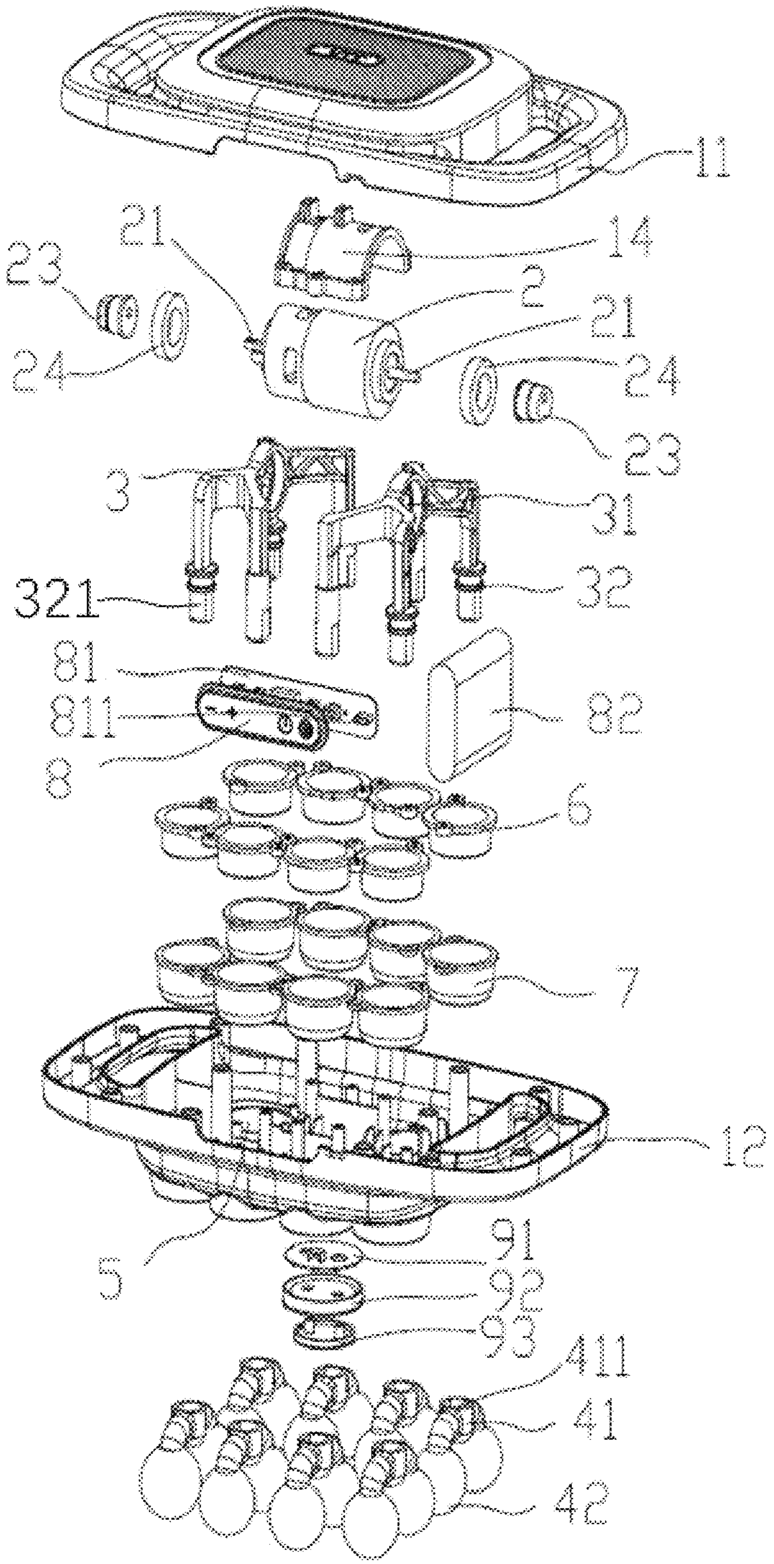
FIG. 1 is an exploded view according to the present disclosure.

The technical solutions in the embodiments of the present disclosure are clearly and completely described below with reference to the drawings in the embodiments of the present disclosure. Apparently, the described embodiments are merely a part rather than all of the embodiments of the present disclosure. All other embodiments obtained by the person of ordinary skill in the art based on the embodiments of the present disclosure without creative efforts shall fall within the protection scope of the present disclosure.

Referring to FIGS. 1-9, a technical solution of the present disclosure is provided. A double-eccentric-wheel-driven massager with replaceable coplanar massage heads includes: a housing 1, centrosymmetrical connecting rods 3, a massage member 4, a limiting portion 5, and a limiting member 6.

The housing 1 includes an upper cover 11 and a lower cover 12.

The drive mechanism 2 is disposed in the housing 1. The drive mechanism 2 is provided with a drive shaft 21.

There are two centrosymmetrical connecting rods 3. Two ends of the drive shaft 21 are respectively connected to the centrosymmetrical connecting rods 3. The centrosymmetrical connecting rod 3 includes an input portion 31 at a middle and symmetrical vertical rods 32 extending downward. The input portion 31 is in driving connection with the drive mechanism 2. The symmetrical vertical rod 32 is driven by the drive mechanism 2 to make a reciprocating motion toward or away from the drive shaft 21.

The massage member 4 is disposed under the lower cover 12. The massage member 4 includes a first connecting rod 41 and first massage heads 42 connected to the first connecting rod 41. The first connecting rod 41 is detachably connected to the symmetrical vertical rod 32.

The limiting portion 5 is disposed on the lower cover 12.

The limiting member 6 is connected to the symmetrical vertical rod 32. The limiting member 6 cooperates with the limiting portion 5, so as to limit a downward motion of the symmetrical vertical rods 32 toward or away from the drive shaft 21, thereby driving a reciprocating motion of the massage member 4 toward or away from the drive shaft 21.

Further, the drive mechanism 2 includes eccentric wheels 23 and rolling bearings 24. The eccentric wheels 23 are respectively sleeved on the two ends of the drive shaft 21. The rolling bearings 24 are respectively sleeved on the eccentric wheels 23. The input portion 31 is an annular sleeving hole. The annular sleeving hole is sleeved on the rolling bearing 24. When driven by the drive mechanism 2, the eccentric wheels 23 on the drive shaft 21 rotate at a same speed and in a same direction, and the annular sleeving hole makes a circular motion, thereby driving the symmetrical vertical rod 32 to make a synchronous reciprocating motion. The rolling bearing 24 is sleeved on the eccentric wheel 23, so as to reduce a coefficient of friction. The reciprocating motion of the massage member 4 toward or away from the drive shaft 21 refers to that a motion trajectory when the massage member 4 moves down or up is similar to an ellipse.

Further, the limiting member 6 is a silicone compression ring. The limiting portion 5 is a channel hole 51 formed in the lower cover 12. The silicone compression ring is internally hollow. The silicone compression ring is sleeved on the symmetrical vertical rod 32. The silicone compression ring includes an upper boss 62 and a lower boss 61. An outer diameter of the upper boss 62 is greater than a diameter of the channel hole 51. An outer diameter of the lower boss 61 is less than the diameter of the channel hole 51. The silicone compression ring is disposed in the housing 1, with the upper boss 62 for limiting hard collision.

Figure 6:
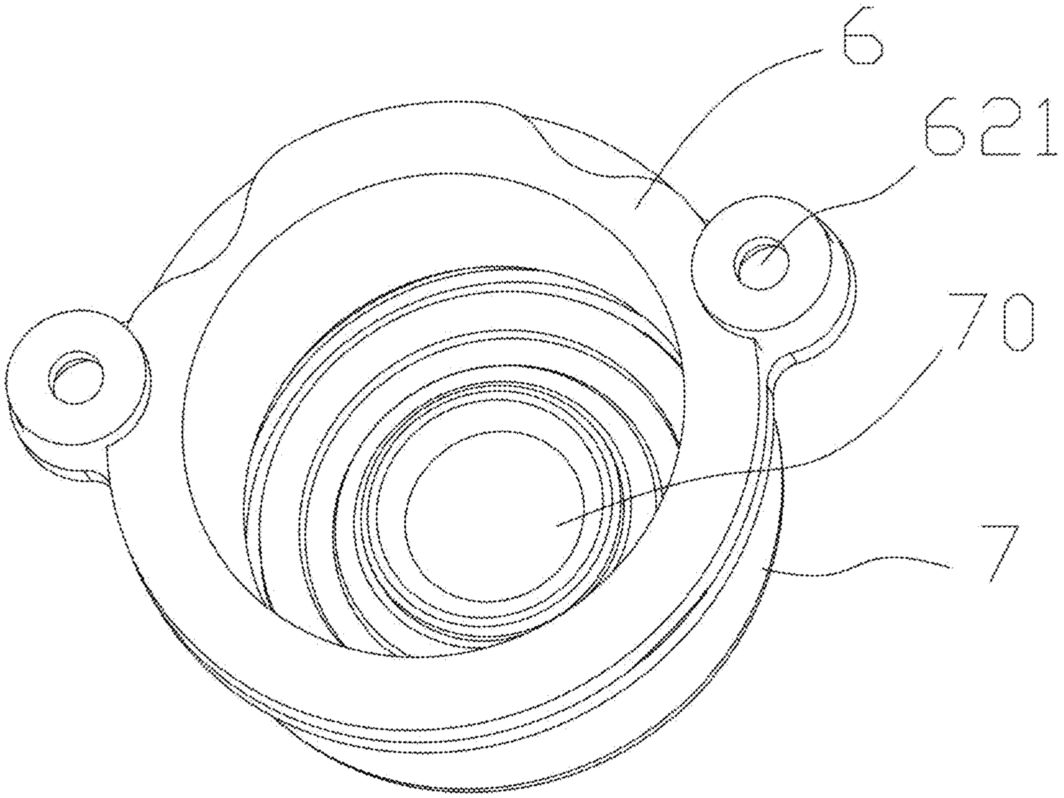
FIG. 6 is a schematic mounting view of cushioning silicone and a silicone compression ring according to the present disclosure.
Figure 7:
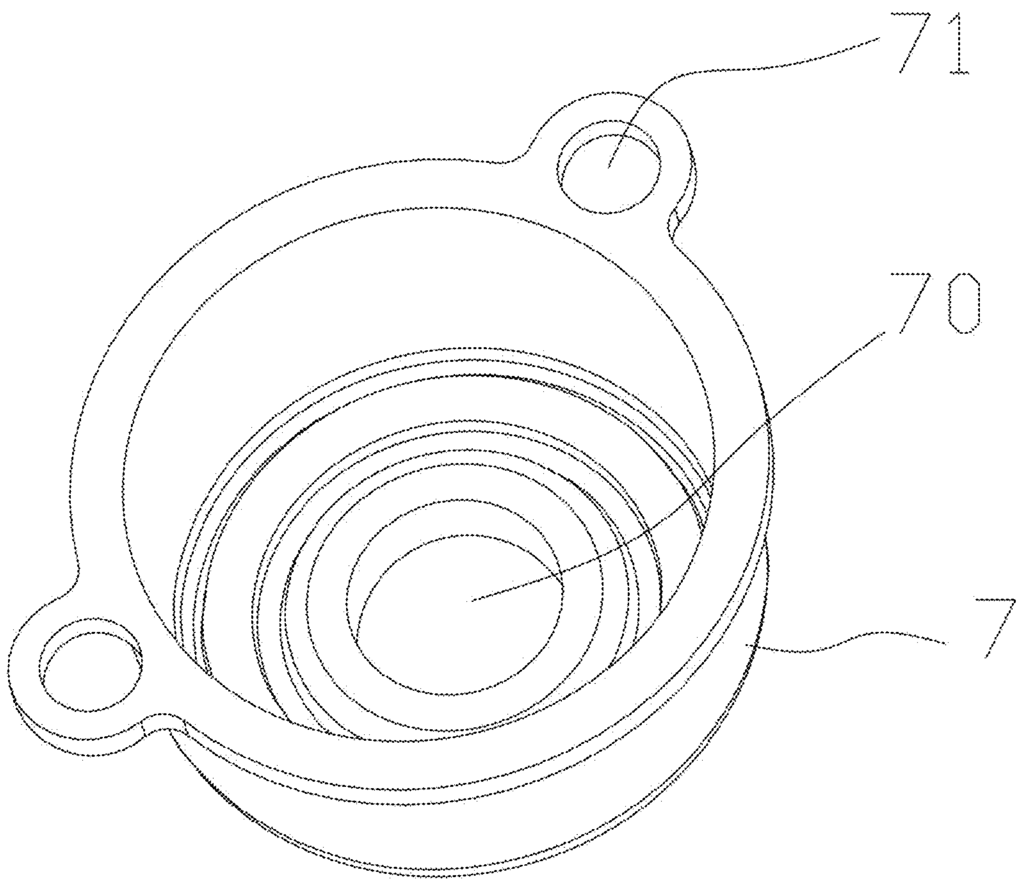
FIG. 7 is a schematic perspective view of cushioning silicone according to the present disclosure.
Figure 8:
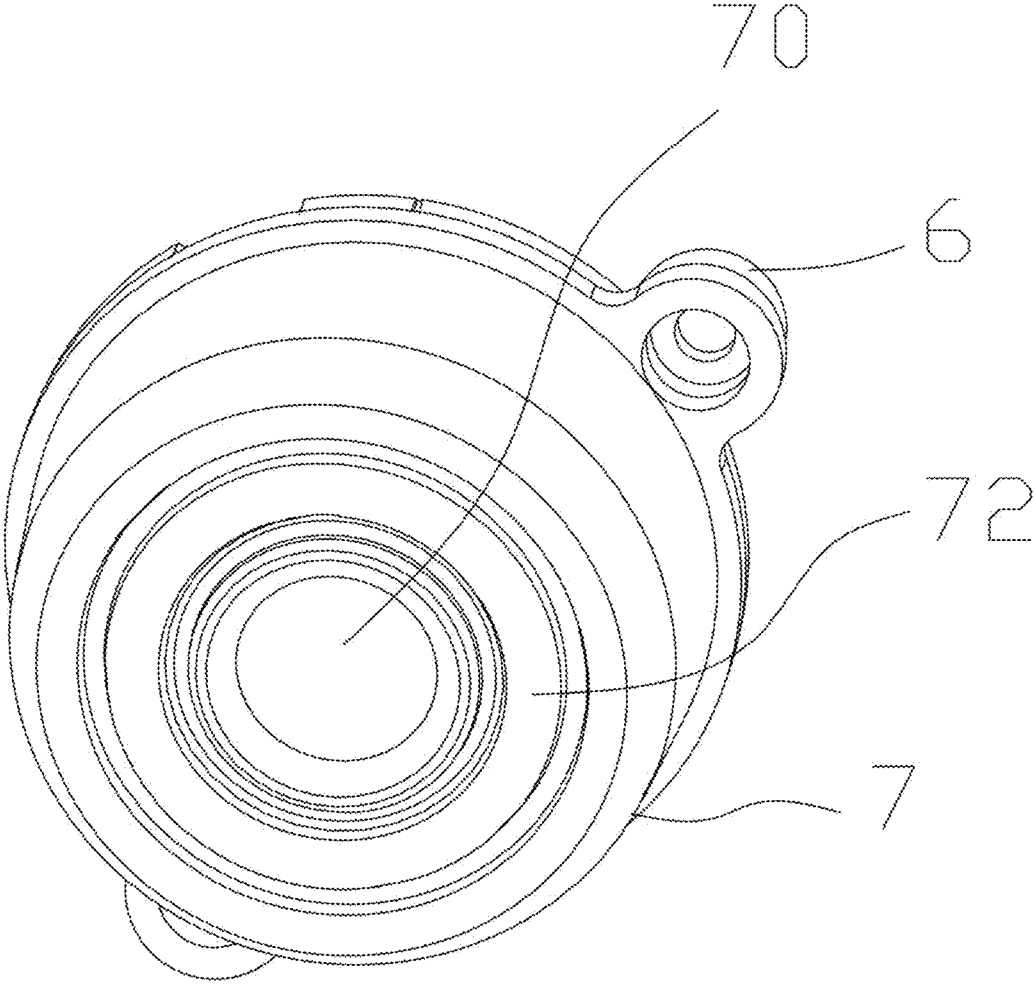
FIG. 8 is another schematic mounting view of cushioning silicone and a silicone compression ring according to the present disclosure.

Further, as shown in FIGS. 6-8, the double-eccentric-wheel-driven massager with replaceable coplanar massage heads further includes cushioning silicone 7. The cushioning silicone 7 is sleeved on the silicone compression ring. The cushioning silicone 7 is sleeved on the lower boss 61. An internal lower side of the cushioning silicone 7 is provided with a mounting hole portion 70 sleeved on the symmetrical vertical rod 32. An outer diameter of the cushioning silicone 7 is less than the diameter of the channel hole 51. First mounting holes 621 are respectively extended outward from two sides of the upper boss 62 of the silicone compression ring. The cushioning silicone 7 is provided with second mounting holes 71 corresponding to the first mounting holes 621 in terms of quantity and position. The first mounting hole 621 is located on the second mounting hole 71. The first mounting hole 621 and the second mounting hole 71 are connected, and connected through a screw. The cushioning silicone is sleeved on the symmetrical vertical rod 32 through the mounting hole portion 70. The silicone compression ring is connected to the symmetrical vertical rod 32 through the cushioning silicone 7. The cushioning silicone 7 plays a buffering role. Coplanar first massage heads refer to that the first massage heads are located on a same horizontal plane through limitation of the silicone compression ring and buffering of the cushioning silicone. The cushioning silicone is provided with an upper boss structure and a lower boss structure. The second mounting hole 71 of the cushioning silicone 7 is located on the upper boss structure of the cushioning silicone. The upper boss 62 of the silicone compression ring is located on the upper boss structure of the cushioning silicone. The lower boss 61 of the silicone compression ring is located in the lower boss structure of the cushioning silicone 7. By this time, through the upper boss structure of the cushioning silicone 7, the hard collision is limited. The cushioning silicone 7 makes the massage more comfortable, and the service life of the product longer.

Further, as shown in FIG. 8, an annular groove 72 is formed between the cushioning silicone 7 and the mounting hole portion 70. Through the annular groove 72, the buffering effect of the cushioning silicone 7 is improved.

Further, as shown in FIG. 1, the double-eccentric-wheel-driven massager with replaceable coplanar massage heads further includes a mainboard 81, a key panel 8, and a battery 82. The mainboard 81 is connected to the key panel 8 and the battery 82. The mainboard 81 and the battery 82 are disposed in the housing 1. The key panel 8 is disposed on the housing 1. The drive mechanism 2 is a motor. The mainboard 81 is configured to control rotation of the motor. The battery 82 is connected to the motor. The motor has a plurality of gears. The plurality of gears are progressively increased or progressively decreased according to a number of rotation times of the motor. A key is disposed on the key panel 8. The number of rotation times of the motor is controlled through the key on the key panel 8, thereby controlling a frequency of the first massage heads.

Figure 2:
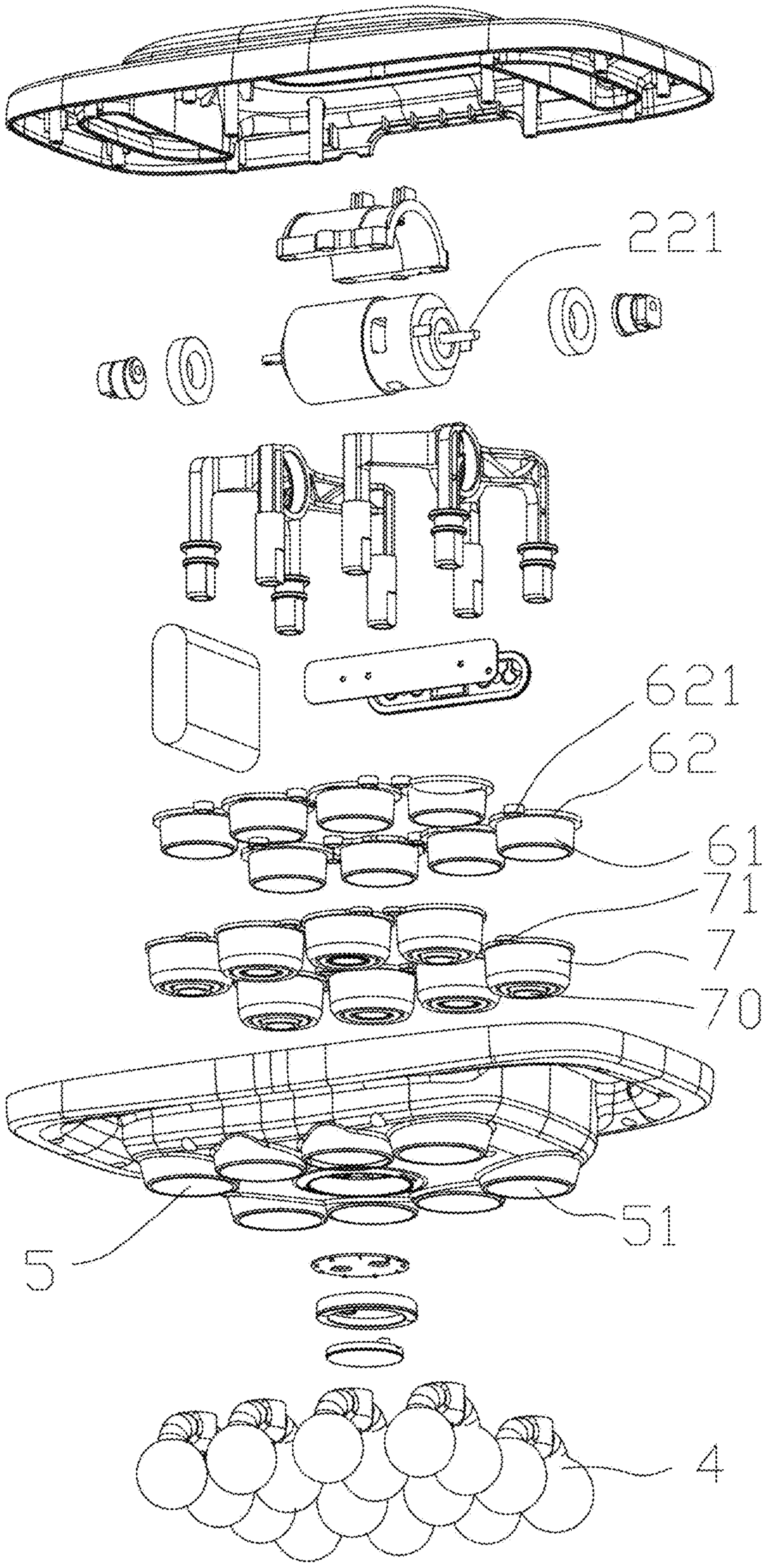
FIG. 2 is another exploded view according to the present disclosure.

Further, as shown in FIG. 2, the double-eccentric-wheel-driven massager with replaceable coplanar massage heads further includes a lighting assembly 9. The lighting assembly 9 is disposed on the lower cover 12. The lighting assembly 9 includes a lamp panel 91, a light guiding member 92, and a decorating member 93. The mainboard 81 is electrically connected to the lamp panel 91. The light guiding member 92 is connected under the lamp panel 91. The decorating member 93 is connected under the light guiding member 92. The light guiding member 92 is clamped with the lower cover 12. The light guiding member and the lamp panel are combined for lighting. The lamp panel 91 may serve as an indicator lamp.

Further, two ends of the housing 1 each are provided with a handle 13. The handle 13 is held by the user conveniently.

Further, as shown in FIG. 1, the motor is connected to the lower cover 12 through a motor fixing plate 14. The motor fixing plate 14 is disposed on the lower cover 12 through a screw. The eccentric wheel 23 is sleeved on an output shaft of the motor. The rolling bearing 24 is sleeved on the eccentric wheel 23. The centrosymmetrical connecting rod 3 is provided with the annular sleeving hole sleeved on the rolling bearing 23. The centrosymmetrical connecting rod 3 includes the symmetrical vertical rod 32 extending downward. The housing 1 includes the upper cover and the lower cover connected to the upper cover. The upper cover 11 and the lower cover 12 are connected or clamped through a bolt. The upper cover 11 and the lower cover 12 are connected to form an accommodating chamber in the housing 1.

Figure 3:
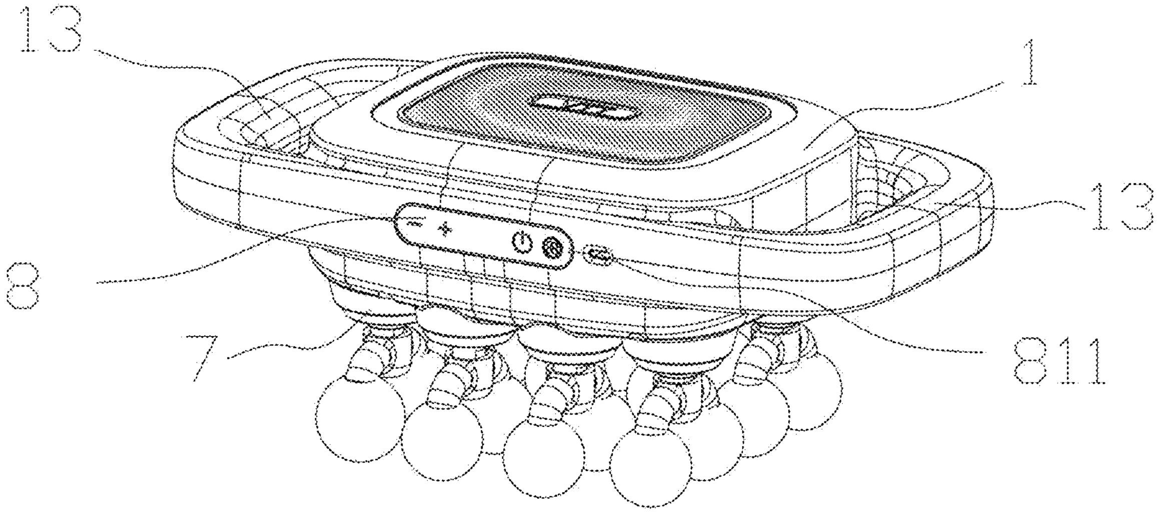
FIG. 3 is a schematic perspective view according to the present disclosure.
Figure 4:
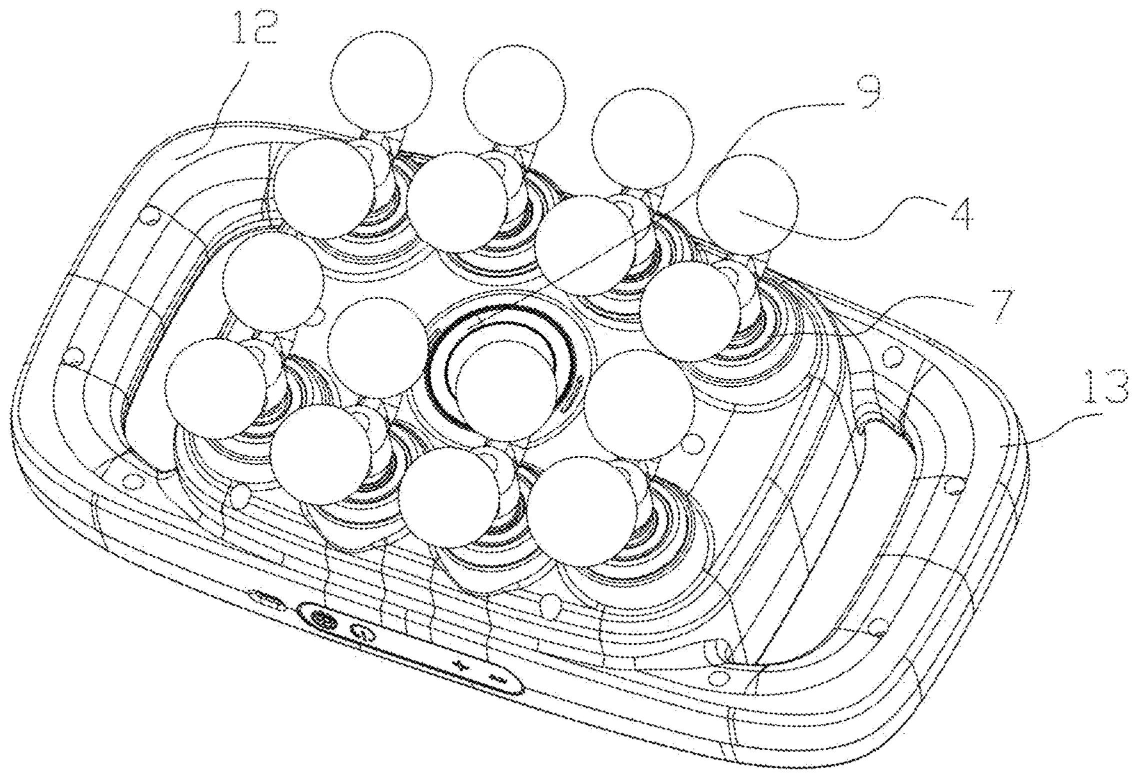
FIG. 4 is another schematic perspective view according to the present disclosure.
Figure 5:
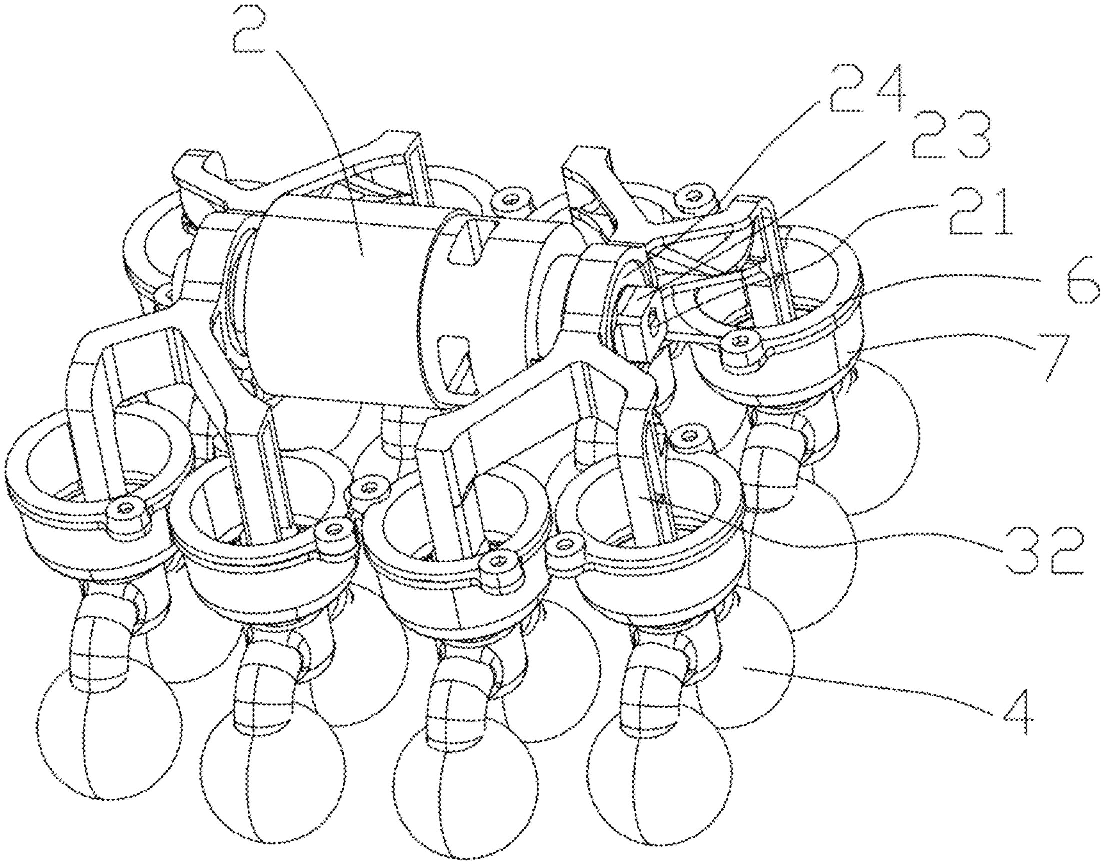
FIG. 5 is a schematic view of connection between a drive mechanism and a centrosymmetrical connecting rod according to the present disclosure.

Further, as shown in FIGS. 1-3, a charging port 811 is formed in the mainboard 81. An exposure hole for exposing the charging port 811 is formed in the housing 1. The battery can be charged through the charging port. The battery is connected to the motor.

Figure 9:
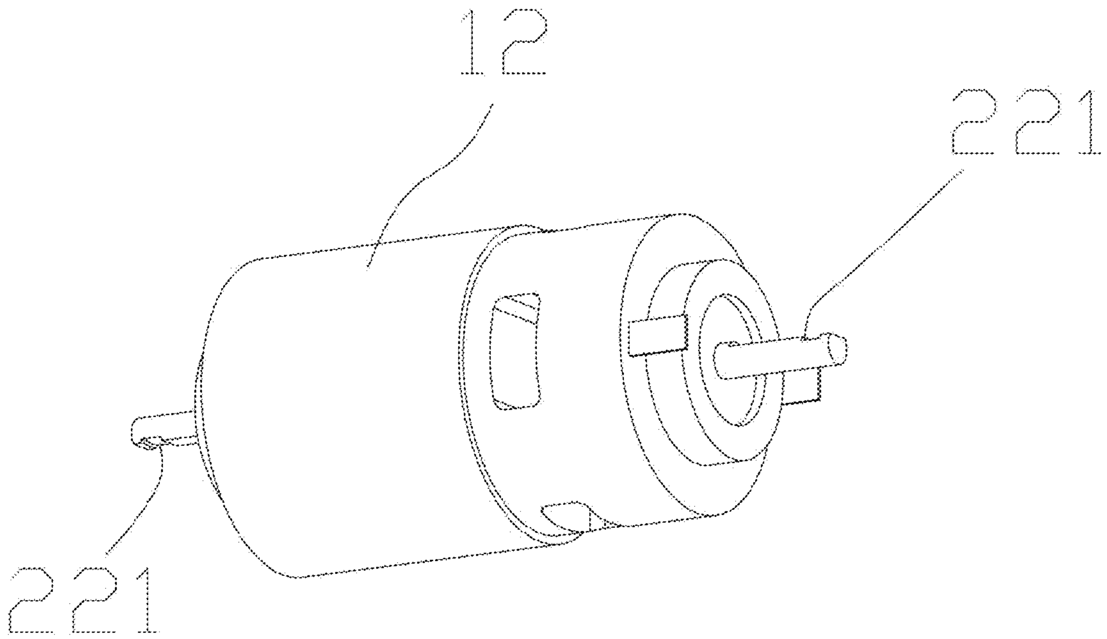
FIG. 9 is a schematic perspective view of a motor according to the present disclosure.

Further, as shown in FIG. 9, mounting portions 221 in opposite directions are respectively disposed at the two ends of the drive shaft 21. The mounting portion 221 is a notched member. The eccentric wheel is sleeved on the notched member. A mounting hole in the eccentric wheel 23 can be connected to the notched member. Consequently, the eccentric wheels 23 rotate oppositely at a same speed, and the annular sleeving hole makes a circular motion, thereby driving the symmetrical vertical rod 32 to make a synchronous reciprocating motion, and the massage member 4 to move up or down.

Further, as shown in FIGS. 1-2, a bottom of the symmetrical vertical rod 32 is provided with a mounting rod 321. The first connecting rod 41 on the massage member 4 is provided with a mounting interface hole 411 matching with the mounting rod 321 in shape for mounting. A silicone sleeve is disposed at the mounting interface hole 411. The first connecting rod 4 is closely connected to the mounting interface hole 411 through the silicone sleeve.

Further, a bottom of the symmetrical vertical rod 32 is provided with a mounting rod 321. The mounting rod 321 is provided with a first buckle. The first connecting rod 41 is provided with a second buckle cooperating with the first buckle. The first buckle of the mounting rod 321 and the second buckle of the first connecting rod 41 are clamped. After the mounting rod 321 is docked with the first connecting rod 41 completely, the massage member 4 is disposed at the bottom of the symmetrical vertical rod 32. The first buckle and the second buckle each are an existing buckle structure, and are not repeated herein.

Further, a bottom of the symmetrical vertical rod 32 is provided with a mounting rod 321. The mounting rod 321 is provided with a first magnet. The first connecting rod 41 is provided with a second magnet cooperating with the first magnet. The first magnet and the second magnet attract each other. In this way, when the mounting rod 321 and the first connecting rod 41 are connected, the massage member 4 is disposed at the bottom of the symmetrical vertical rod 32. The bottom of the symmetrical vertical rod 32 is provided with four mounting rods 321, such that four massage members 4 can be provided. In the four mounting rods 321, two left mounting rods 321 are the same and symmetrical, and two right mounting rods 321 are the same and symmetrical. The first massage heads 42 are spherical or conical or flathead-shaped.

Further, the first connecting rod 41 is Y-shaped. Two ends of a bottom of the first connecting rod 41 are respectively connected to the first massage heads 42. A middle of the first connecting rod 41 is connected to the bottom of the symmetrical vertical rod 32. In this way, one first connecting rod 41 can be connected to two first massage heads 42, and the sixteen first massage heads 42 can be provided for all symmetrical vertical rods 32, thereby increasing a massage area.

Further, the first massage heads 42 are spherical or conical or flathead-shaped. The first massage heads 42 on the massage member 4 may be different. The first massage heads 42 are located on the same horizontal plane, such that different touch senses can be created for the user in massage, being more comfortable.

The present disclosure has the following working process: The drive mechanism 2 is the motor. By starting the motor, the drive shaft 21 is driven to rotate. The eccentric wheel 23 also rotates with the drive shaft. With rotation of the eccentric wheel 23, the rolling bearing 24 moves around the eccentric wheel 23. The centrosymmetrical connecting rod 3 sleeved on the rolling bearing 24 drives the symmetrical vertical rod 32 to move up and down. The first massage head 42 on the massage member 4 also moves up and down to generate a high-frequency vibrating massage function. The operation principle is as follows: Once the motor is started, the double eccentric wheels 23 rotate in a same direction and at a same speed, the central sleeving hole of the connecting rod makes a circular motion, and the symmetrical vertical rod 32 makes a synchronous reciprocating motion. The silicone compression ring takes a limiting effect when colliding against the housing. The first massage head 42 is configured for pressing with an amplitude, and the cushioning silicone absorbs an impact.

The massage member 4 in the present disclosure may be in the close-fit connection with the symmetrical vertical rod 32 through the buckle and the magnet, thereby realizing second-level replacement, and adapting to different massage scenarios. The present disclosure has the following advantages: Dynamic level maintenance: A leveling base is configured to maintain the first massage heads 42 coplanar in vibration (the "base" in the leveling base refers to a lower shell. The first massage heads 42 are coplanar, which refers to that the first massage heads 42 are located on the same horizontal plane). Accurate amplitude control: A travel error is controlled in a small range through double-step limitation. The double steps refer to that the cushioning silicone 7 and the silicone compression ring each are provided with a step structure. The silicone compression ring is provided with the upper boss 62 and the lower boss 61. The cushioning silicone 7 is provided with the upper boss structure and the lower boss structure.

Although the embodiments of the present disclosure have been illustrated and described, it should be understood that those of ordinary skill in the art may make various changes, modifications, replacements and variations to the above examples without departing from the principle and spirit of the present disclosure, and the scope of the present disclosure is limited by the appended claims and their legal equivalents.

What is claimed is:

1. A double-eccentric-wheel-driven massager with replaceable coplanar massage heads, comprising:

a housing, the housing comprising an upper cover and a lower cover;

a drive mechanism, wherein the drive mechanism is disposed in the housing and comprises a drive shaft;

two centrosymmetrical connecting rods, wherein two ends of the drive shaft are respectively connected to the two centrosymmetrical connecting rods; wherein each of the two centrosymmetrical connecting rods comprises an input portion at a middle and symmetrical vertical rods extending downward, wherein the input portion is in driving connection with the drive mechanism, and the symmetrical vertical rods are driven by the drive mechanism to make a reciprocating motion toward or away from the drive shaft;

a massage member, disposed under the lower cover; wherein the massage member comprises a first connecting rod and first massage heads connected to the first connecting rod; and wherein the first connecting rod is detachably connected to a corresponding symmetrical vertical rod;

a limiting portion, the limiting portion being disposed on the lower cover; and wherein the limiting portion is a channel hole defined in the lower cover;

a limiting piece, connected to a corresponding symmetrical vertical rod; and wherein the limiting piece cooperates with the limiting portion, so as to limit a downward motion of the corresponding symmetrical vertical rod, thereby driving a reciprocating motion of the massage member; wherein the limiting piece is a silicone compression ring; wherein the silicone compression ring is internally hollow and is sleeved on the corresponding symmetrical vertical rod; wherein the silicone compression ring comprises an upper boss and a lower boss, wherein an outer diameter of the upper boss is greater than a diameter of the channel hole, and wherein an outer diameter of the lower boss is less than the diameter of the channel hole; and cushioning silicone, sleeved on the silicone compression ring; wherein the cushioning silicone is sleeved on the lower boss; wherein an internal lower side of the cushioning silicone comprises a mounting hole portion sleeved on the corresponding symmetrical vertical rod; wherein an outer diameter of the cushioning silicone is less than the diameter of the channel hole; wherein there are defined first mounting holes that are respectively extended outward from two sides of the upper boss of the silicone compression ring; wherein the cushioning silicone comprises second mounting holes corresponding to the first mounting holes in terms of quantity and position; wherein the first mounting hole is located in the second mounting hole; and wherein the first mounting hole and the second mounting hole are connected.

2. The double-eccentric-wheel-driven massager with replaceable coplanar massage heads according to claim 1, wherein the drive mechanism comprises eccentric wheels and rolling bearings; wherein the eccentric wheels are respectively sleeved on the two ends of the drive shaft; the rolling bearings are respectively sleeved on the eccentric wheels; the input portion is an annular sleeving hole; the annular sleeving hole is sleeved on the rolling bearing; and when driven by the drive mechanism, the eccentric wheels on the drive shaft rotate at a same speed and in a same direction, and the annular sleeving hole makes a circular motion, thereby driving the symmetrical vertical rods to perform a synchronous reciprocating motion.

3. The double-eccentric-wheel-driven massager with replaceable coplanar massage heads according to claim 1, further comprising a mainboard, a key panel, and a battery, wherein the mainboard is connected to the key panel and the battery; the mainboard and the battery are disposed in the housing; the key panel is disposed on the housing; the drive mechanism additionally comprises a motor; the mainboard is configured to control rotation of the motor; and the battery is connected to the motor.

4. The double-eccentric-wheel-driven massager with replaceable coplanar massage heads according to claim 3, further comprising a lighting assembly, wherein the lighting assembly is disposed on the lower cover; the lighting assembly comprises a lamp panel, a light guiding member, and a decorating member; the mainboard is electrically connected to the lamp panel; the light guiding member is connected under the lamp panel; the decorating member is connected under the light guiding member; and the light guiding member is clamped with the lower cover.

5. The double-eccentric-wheel-driven massager with replaceable coplanar massage heads according to claim 3, further comprising a handle disposed at each of two ends of the housing.

6. The double-eccentric-wheel-driven massager with replaceable coplanar massage heads according to claim 3, wherein a charging port is defined in the mainboard; and an exposure hole for exposing the charging port is defined in the housing.

7. The double-eccentric-wheel-driven massager with replaceable coplanar massage heads according to claim 3, wherein mounting portions in opposite directions are respectively disposed at the two ends of the drive shaft; the mounting portion is a notched member; and the eccentric wheel is sleeved on the notched member.

8. The double-eccentric-wheel-driven massager with replaceable coplanar massage heads according to claim 1, wherein a bottom of the symmetrical vertical rod is provided with a mounting rod; the first connecting rod is provided with a mounting interface hole matching with the mounting rod in shape for mounting; a silicone sleeve is disposed at the mounting interface hole; and the first connecting rod is closely connected to the mounting interface hole through the silicone sleeve.

9. The double-eccentric-wheel-driven massager with replaceable coplanar massage heads according to claim 1, wherein a bottom of the symmetrical vertical rod comprises a mounting rod; the mounting rod comprises a first buckle; and wherein the first connecting rod comprises a second buckle configured to be engaged with the first buckle.

10. The double-eccentric-wheel-driven massager with replaceable coplanar massage heads according to claim 1, wherein a bottom of the symmetrical vertical rod comprises a mounting rod; the mounting rod comprises a first magnet; wherein the first connecting rod comprises a second magnet cooperating with the first magnet; and wherein the first magnet and the second magnet are configured to be attracted to each other.

11. The double-eccentric-wheel-driven massager with replaceable coplanar massage heads according to claim 1, wherein there is formed an annular groove between the cushioning silicone and the mounting hole portion.

12. The double-eccentric-wheel-driven massager with replaceable coplanar massage heads according to claim 1, wherein the first connecting rod is Y-shaped; and wherein two ends of a bottom of the first connecting rod are respectively connected to the first massage heads.

13. The double-eccentric-wheel-driven massager with replaceable coplanar massage heads according to claim 12, wherein the first massage heads are spherical or conical or flathead-shaped.

* * * * *